Nov. 4, 1969

G. D. LINE 3,476,093

HYDRAULIC VALVE LIFTER

Filed Oct. 10, 1967

INVENTOR.
GERALD D. LINE

BY
*Yount, Raney, Flynn and Tarolli*
ATTORNEYS

Nov. 4, 1969

G. D. LINE 3,476,093

HYDRAULIC VALVE LIFTER

Filed Oct. 10, 1967

INVENTOR.
GERALD D. LINE

BY
*Young, Raury, Flynn and Tarolli*
ATTORNEYS

Nov. 4, 1969  G. D. LINE  3,476,093
HYDRAULIC VALVE LIFTER

Filed Oct. 10, 1967  3 Sheets-Sheet 2

INVENTOR.
GERALD D. LINE

BY
Young, Roney, Flynn and Tarolli
ATTORNEYS

United States Patent Office
3,476,093
Patented Nov. 4, 1969

3,476,093
HYDRAULIC VALVE LIFTER
Gerald D. Line, Saginaw, Mich., assignor to Eaton Yale
& Towne Inc., Cleveland, Ohio, a corporation of Ohio
Filed Oct. 10, 1967, Ser. No. 674,287
Int. Cl. F01l 25/02; F16k 15/00, 17/00
U.S. Cl. 123—90                                        26 Claims

ABSTRACT OF THE DISCLOSURE

A metering means for a hydraulic valve lifter comprises a metering member operatively associated with the push rod socket member to control the flow of lubricant through a fluid passageway therein from a fluid reservoir within the hydraulic valve lifter. The metering member and the socket member have metering surfaces, which form a metering passageway and which are substantially parallel to the direction of movement of the socket member, and wherein the metering member is moved by changes in fluid pressure acting thereon, in a direction substantially perpendicular to the direction of reciprocating movement of the lifter.

---

The present invention relates to a hydraulic valve lifter, and in particular to a metering means for a hydraulic valve lifter which functions to control the flow of lubricating fluid from the valve lifter to a rocker arm assembly.

Hydraulic valve lifters have been provided with metering means which control the flow of lubricant from the lifters. U.S. Patents Nos. 2,818,050 and 2,964,027 illustrate such lifters wherein a metering member cooperates with a push rod socket member to control the flow of lubricant from the lifter. Such lifters are constructed in such a manner that the mass of the metering member is somewhat critical. The mass must be such that will provide proper lubricant flow at all rates of reciprocating motion of the lifter. Moreover, when lubricant pressure in the lifter decreases, the metering member tends to unseat from its metering surface and, thus, interferes with metering of the lubricant.

Accordingly, a principal object of the present invention is the provision of a new and improved hydraulic valve lifter having a metering member for metering lubricant flow from the lifter and which is associated with the other parts of the lifter so that the reciprocating motion of the lifter does not interfere with the operation of the metering member.

A further object of the present invention is the provision of a new and improved hydraulic valve lifter having a metering member, the mass of which is not critical to the metering action.

An important object of the present invention is to provide a new and improved hydraulic valve lifter having metering means for metering the flow of lubricant from the valve lifter to a rocker arm of a valve train to maintain a desired lubricant delivery rate to the rocker arm through the range of intended operating speeds.

Another object of this invention is to provide a new and improved hydraulic valve lifter having a metering means which includes metering surfaces which extend substantially parallel to the reciprocating movement of the hydraulic valve lifter, and wherein one of the metering surfaces is on a metering member, and wherein the fluid pressure of the lubricant is the only substantial force acting to move the metering member to vary the metering action.

A further object of the present invention is the provision of a new and improved hydraulic valve lifter, as noted in the next preceding paragraph, wherein the fluid pressure acting on the metering member effects movement thereof in a direction substantially perpendicular to the direction of reciprocating motion of the valve lifter.

A still further object of this invention is to provide a new and improved hydraulic valve lifter having a metering ring which encircles a push rod socket member of the hydraulic valve lifter and wherein the inner annular surface of the metering ring and the annular peripheral surface of the push rod socket member form a metering passageway through which lubricant may flow from a fluid reservoir in the hydraulic valve lifter.

Another object of the present invention is to provide a new and improved hydraulic valve lifter having a metering member in the form of a metering cup which encircles the socket member of the hydraulic valve lifter and wherein an inner annular surface of the metering cup cooperates with an annular peripheral surface of the socket member to define a metering passageway through which lubricant may flow from a fluid reservoir in the hydraulic valve lifter.

Still another object of the present invention is to provide a new and improved hydraulic valve lifter having a metering pin which has a head thereon and wherein metering is accomplished between the head of the pin and a surface on a push rod socket member to thereby control the flow of lubricant from a fluid reservoir in the hydraulic valve lifter.

A further object of the present invention is to provide a new and improved hydraulic valve lifter having a metering member that loosely cooperates with an inlet to a fluid passageway on a peripheral surface of the socket member permitting sufficient movement to take place between the metering member and the inlet on the peripheral surface of the socket to keep the surfaces and the inlet to the passageway clean.

A still further object of the present invention is the provision of a new and improved hydraulic valve lifter having a metering member which cooperates with a pushrod socket member to meter lubricant flow through the push rod and wherein the metering member acts to effect blocking of the draining of fluid from the push rod during engine shutdown.

Further objects and advantages of the present invention will be apparent from the following detailed description of preferred embodiments of the present invention made with reference to the accompanying drawings wherein.

The present invention provides an improved hydraulic valve lifter, and particularly an improved metering means for metering the flow of lubricant from within the lifter to a valve gear. The metering means is constructed so that the metering action is not substantially affected by the inertia or mass of a metering member. A hydraulic lifter embodying the present invention may be used in different engine environments, and the drawings illustrate, by way of example, a hydraulic lifter 10 used in association with a V-type internal combustion engine.

Figure 1:
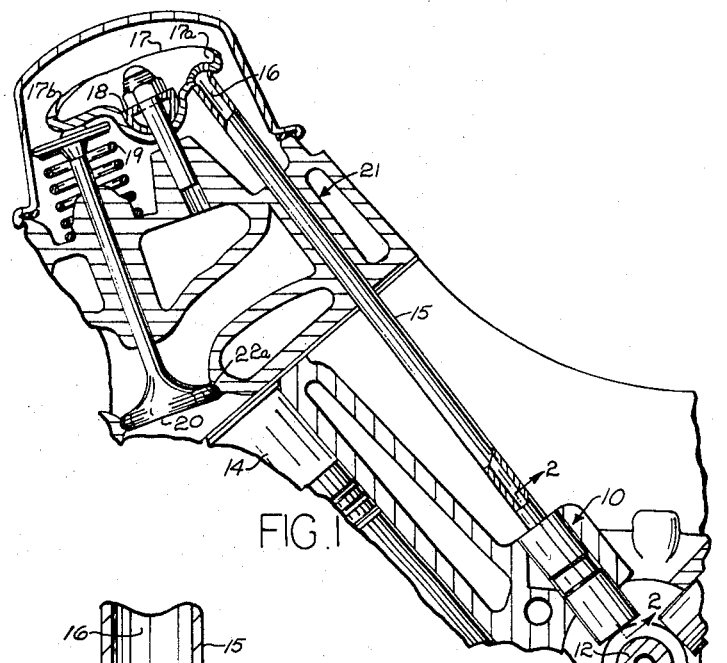
FIG. 1 is a view of a hydraulic valve lifter and the related assemblies in an engine block.

The hydraulic valve lifter 10, as illustrated in FIG. 1, controls the movement of an engine valve 20. The valve 20 controls the flow of gases into and from the combustion chamber 14 of a cylinder of the engine. The valve member 20 is moved between open and closed positions with respect to a valve seat 20a by a valve gear, generally designated 21.

The valve gear 21 is actuated by a cam 9 which engages the hydraulic lifter 10. The cam 9 consists of a circular portion 11 and a raised portion 13, which rotate with a cam shaft 12. The bottom portion of the lifter 10 engages the cam 9 which imparts motion to the lifter during its rotation. The cam 9 rotates in a clockwise direction and an upward motion is imparted to the lifter 10 as the ramp 13a of the cam 9 engages and moves relative to the lifter 10. An upward motion of the lifter 10 effects an upward movement of the valve gear 21 and an opening of the valve 20. When the ramp 13b engages and moves relative to the lifter 10, a downward movement of the lifter 10 and of the valve gear 21 is effected. The downward movement of the valve gear 21 closes valve 20 and it engages the valve seat 20a.

A push rod 15 is interposed between the lifter 10 and a rocker arm 17. Movement of the push rod 15 by the lifter 10 causes the rocker arm 17 to pivot about bearing 18 and effect opening or closing of the valve 20. The push rod 15 has a tubular inner passageway 16 which allows lubricant to flow therethrough from the valve lifter 10 to the bearing 18 of the rocker arm. When the rocker arm 17 is raised by an upward movement of the push rod 15 acting upon a shoulder 17a, the rocker arm 17 pivots about the bearing 18 and a shoulder 17b of the rocker arm 17 exerts a downward force to open the valve 20. The spring 19 biases the shoulder 17b upwardly so that when the ramp 13b engages the lifter, the spring 19 effects an upward movement on shoulder 17b to engage valve 20 with the valve seat 20a and causes the rocker arm 17 to pivot and thereby causes the push rod 15 and valve lifter 10 to move downwardly.

Figure 2:
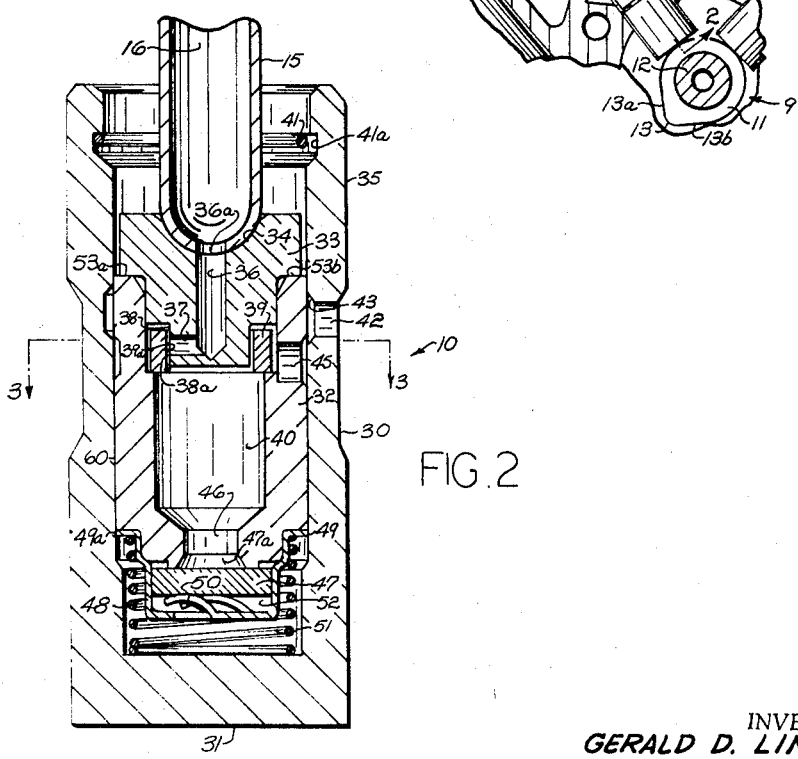
FIG. 2 is a cross-sectional view of an embodiment of the invention incorporating a metering ring and taken approximately along the line 2—2 of FIG. 1.

The hydraulic valve lifter 10, as illustrated in FIG. 2 comprises a cup-shaped body member 30. The cup-shaped body member 30 has a closed end 31 which is engaged by the cam 9 as shown in FIG. 1. Disposed within the hollow body member 30 are a plunger member 32 and a push rod socket member 33. Seated within the push rod socket on a push rod seat 34 is the push rod 15. A snap ring 41 is disposed in an annular groove 41a in the portion 35 of the hollow body member 30 to hold the parts of the lifter within the body member 30.

The plunger member 32 at least in part defines a lubricant reservoir 40. Lubricant is pumped into a passageway 42 in the portion 35 of body member 30 by some suitable means not illustrated, such as a pump. The passageway 42 communicates with an annular groove 43 in the portion 35 of the body member 30 which in turn communicates with a passageway 45 in the plunger member 32 to allow lubricant to flow into the reservoir 40. Therefore, during normal operations the reservoir 40 is filled with lubricant.

The reservoir 40 communicates with a lower pressure chamber 52 by means of a passageway 46 located in the lower end of the plunger member 32. Disposed within the pressure chamber 52 is a check valve 47. The check valve 47 rests within a check valve retaining cup 48 connected to the plunger member 32 at the shoulders 49, 49a. The check valve 47 is biased into engagement with a valve seat 47a formed on the lower end of the plunger member 32 by a spring means 50 attached to the bottom of the check valve retainer cup 48.

When the hollow body member 30 is moving in a downward direction, the check valve 47 tends to open and allow lubricant to flow from the reservoir 40 through passageway 46 into the pressure chamber 52. The check valve 47 opens when the chamber 52 enlarges with a corresponding reduction in pressure therein. The enlargement of chamber 52 is effected by the plunger spring 51 which biases the plunger 32 away from the bottom portion 31 of the body member 30. During a downward motion of the lifter 10 the forces acting thereon are such that the spring 51 effects enlargement of the pressure chamber 52, as is well known. The drop in pressure in chamber 52 leaves the check valve 47 with unbalanced forces acting thereon. The pressure acting on check valve 47 from the reservoir 40 is much greater than the pressure in chamber 52 and overcomes the force of the spring 50 and the pressure in the chamber 52 to open the check valve 47. When the body member 30 moves upwardly the fluid pressure in the chamber 52 is increased. The pressure increase in chamber 52 tends to push the check valve 47 against the valve seat 47a, thus sealing the pressure chamber 52 from the reservoir 40.

When the check valve 47 closes passageway 46 due to an upward movement of the body member 30, the lubricant in the pressure chamber 52 is essentially sealed therein. The lubricant sealed within the pressure chamber 52 is substantially incompressible and therefore when the hollow body member 30 is raised, the lubricant within the pressure chamber 52 will exert an upward force which resists downward movement of the plunger member 32 relative to the body member 50. As a result, the plunger member 32 moves in an upward direction, thus opening the valve 20 as described hereinabove. During each valve opening stroke, a small amount of lubricant trapped in the pressure chamber 52 escapes or leaks around the plunger through a small space 60 disposed between the body member and the plunger member. This leakage is termed "leak-down" and is necessary in order to insure that the valve 20 can be fully seated on the subsequent return stroke which occurs with a continued rotation of the cam 9. Were it not for this "leak-down" during each lifting stroke and any of the parts of valve train lengthened due to an increase in temperature, such greater length would hold the engine valve 20 slightly off its seat 20a.

The plunger member 32 is designed to abut the socket member 33 at shoulders 53, 53a of the socket member 33 and the plunger return spring 51 biases the plunger into engagement with the socket 33 during normal operation. Therefore, an upward movement of the plunger member 32 causes an upward movement of the socket member 33. This upward movement of the socket member causes the push rod 15 which is engaged upon the push rod seat 34 of the socket member to move upwardly. The upward movement of the push rod 15 and its opening of valve 20 has been described hereinabove.

The hydraulic lifter 10 provides for lubricant flow through the push rod passage 16 to the rocker arm 17, in a well known manner. To this end, the socket member 33 has an annular peripheral surface 38 upon which is located an inlet 38a. A radially extending passageway 37 is interposed between the inlet 38a and a perpendicular passageway 36. The passageway 36 has an outlet 36a in communication with the push rod seat 34. The passageways 36, 37 and the openings 38a, 36a allow lubricant to flow from the reservoir 40 through the passageways to the passageway 16 within the push rod 15 and to the rocker arm 17.

In accordance with the present invention, the hydraulic valve lifter 10 includes a metering means for metering the flow of lubricant from the reservoir 40 through the push rod 15 and to the rocker arm 17. The metering means is constructed and is associated with the other parts of the hydraulic valve lifter 10 so that the reciprocating motion of the lifter does not interfere with the metering action. Moreover, the construction and association of the metering means with the other parts of the lifter is such that the specific weight of the metering member is not critical to the operation thereof. This will become apparent with the detailed description herein below of preferred embodiments of the present invention.

Figure 3:
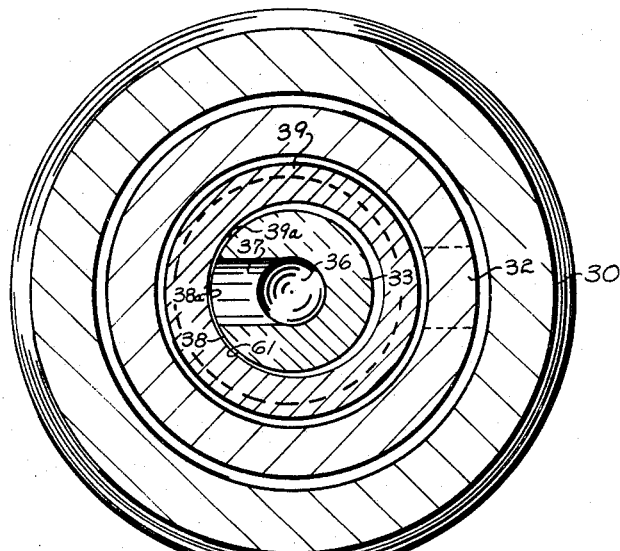
FIG. 3 is a cross-sectional view taken approximately along the line 3—3 of FIG. 2.

In the embodiment of FIG. 2 an annular metering ring 39 is disposed between the annular peripheral surface 38 of the socket member 33 and the plunger member 32. The metering ring 39 contains an inner annular surface 39a designed to cooperate with the annular peripheral surface 38 of the socket 33 to control the flow of lubricant through the inlet 38a. The fluid pressure of the lubricant acting upon the annular metering ring 39 imparts motion perpendicular to the reciprocating motion of the lifter and causes the ring 39 to engage with the peripheral surface 38 of the socket member 33. A tapered passageway 61 is formed by the inner annular surface 39a of the ring 39 and the annular peripheral surface 38 of the socket 33 as shown in FIG. 3. The surfaces 38 and 39a are substantially parallel to the reciprocating movement of the lifter and operate to meter the flow of lubricant through inlet 38a.

The amount of metering that is desired can be controlled by varying the radii of the metering ring 39, the annular peripheral surface 38, and the size of the inlet 38a. For example if in the illustrated embodiment in FIG. 3 there is not enough lubricant flowing into the passageway 38a one of three things could be done to alleviate the problem. First the radius of annular ring 39 could be enlarged. This would cause the pasageway 61 to become expanded and thus allow more lubricant into the inlet 38a. Secondly the radius of the annular surface 38 of the socket member 33 could be made smaller. By making the radius of the annular surface 38 smaller the tapered passageway 61 would become enlarged and allow more lubricant to flow through the inlet 38a. Thirdly the inlet 38a could be enlarged, this also would allow more open area for the lubricant to flow through.

The metering ring 39 is constructed with a loose fit between the outer diameter of the socket 33 and the inner diameter of the plunger 32. The metering ring 39 can thus move over and against the socket in the direction of lubricant flow thus, metering the lubricant. Also because of its loose fit the ring will tend to have sufficient motion substantially perpendicular to the reciprocating motion of the lifter to keep the metering surfaces 38, 39a clean.

It should be apparent from the above that the metering ring 39 reciprocates as a part of the lifter 10. Since the metering surfaces 38, 39a are substantially parallel to the direction of reciprocation any relative movement therebetween in the direction of reciprocation will not greatly affect the metering action, as long as at least a part of the metering ring 39 overlies inlet 38a. Any such relative movement is independent of the mass of the metering ring 39 and therefore this mass is not critical.

Figure 4:
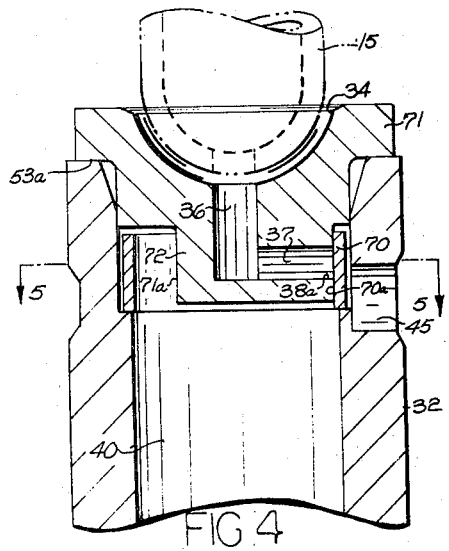
FIG. 4 is a cross-sectional view of another embodiment of the present invention.
Figure 5:
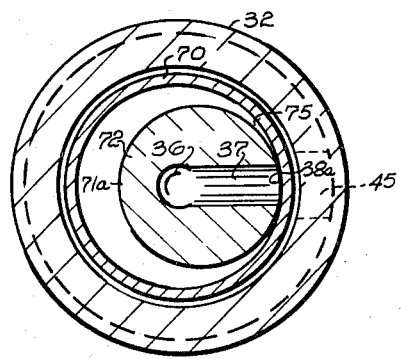
FIG. 5 is a cross-sectional view taken approximately along line 5—5 of FIG. 4.
Figure 6:
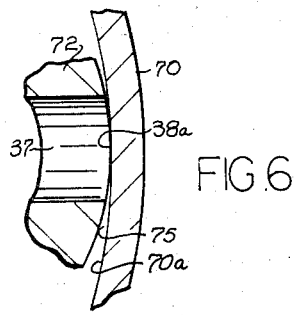
FIG. 6 is an enlarged fragmentary cross-sectional view of FIG. 5.

Another embodiment of the present invention is illustrated in FIG. 4. Similar reference numbers are used to designate parts similar to the parts shown in FIG. 2. FIGURE 4 shows a socket member 71 disposed within the plunger 32. The socket member 71 has an annular lower portion 72 offset from the axial centerline of the socket member 71. The offset portion 72 has a smaller diameter than the previously illustrated socket. This allows a faster drop off and clearance between the inner diameter 70a of the metering ring 70 and the outer diameter 71a of the lower portion 72 of socket 71. The amount of lubricant thus being metered through the tapered metering passage 75 is established by the difference of the diameters of the metering ring 70 and socket 71 and also by the size of the inlet 38a in the side of the socket 71. The lubricant pressure acting on ring 70 acts as previously described to accomplish metering.

It should be apparent that the embodiment illustrated in FIG. 4 is similar in operation to the embodiment illustrated in FIG. 2. Both have metering surfaces on a metering ring socket member which extends substantially parallel to the reciprocating motion of the lifter and both are sensitive to lubricant pressure to effect movement of the metering ring substantially perpendicular to the reciprocating motion of the lifter to accomplish metering. Also, the general operation and motion of each lifter in conjunction with its related parts is the same.

Figure 7:
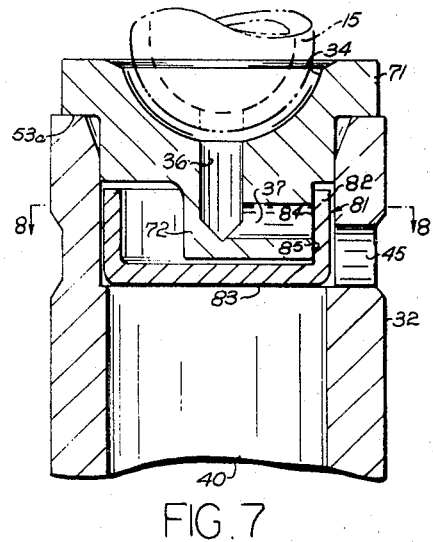
FIG. 7 is a cross-sectional view of still another embodiment of the present invention incorporating a metering cup.

A further embodiment of the present invention is illustrated in FIG. 7. In this embodiment a socket member 71, essentially the same as the socket member 71 in FIG. 4, is surrounded by an annular metering cup member generally designated 81. The cup member 81 has an annular side or skirt portion 82 and a bottom portion 83, the side portion 82 has an inner annular surface 84 which cooperates with the annular peripheral surface 85 of the socket member 71 to accomplish metering of lubricant from the reservoir 40.

Figure 8:
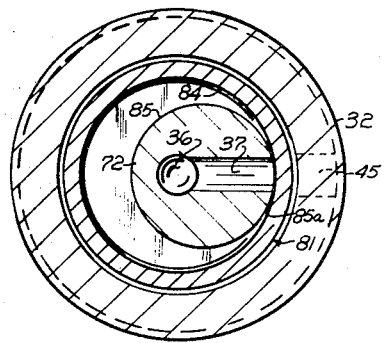
FIG. 8 is a sectional view taken approximately along the line 8—8 of FIG. 7.

The metering cup 81 is operable, upon the application of fluid pressure thereon, to engage the annular peripheral surface 85 of the socket member 71 in much the same manner as the metering ring 39 cooperates with the peripheral annular surface 38 of the socket member 33 as shown in FIG. 2. Thus, the application of lubricant pressure upon the metering cup member 81 causes it to move substantially perpendicular to the reciprocating motion of the lifter and restrict the tapered metering passageway 85a as shown in FIG. 8. The metering passageway 85a allows a variable amount of lubricant therethrough depending upon the lubricant pressure acting upon the metering cup member 81.

The metering cup 81 fits loosely around the outer surface 85 of the socket member 71 and within the plunger 32. The cup 81 can thus move over and against the socket 71 in the direction of lubricant flow to meter the lubricant. Also, as a result of this loose fit, the cup 81 will have sufficient motion against the metering surfaces to keep the metering surfaces and the inlet thereon clean.

Accordingly, the metering of lubricant by the embodiment of FIG. 7 is accomplished in a similar manner to that described in conjunction with FIG. 2. The metering surfaces 84, 85 extend substantially parallel to the reciprocating motion of the lifter and the metering cup member 81 is sensitive to restrict the tapered fluid passageway 85a and moves substantially perpendicular to the reciprocating motion of the lifter in response to lubricant pressure thereon. Also, the general operation of the lifter of FIGS. 7 and 8 in conjunction with its related parts is the same as the lifters described above.

Figure 9:
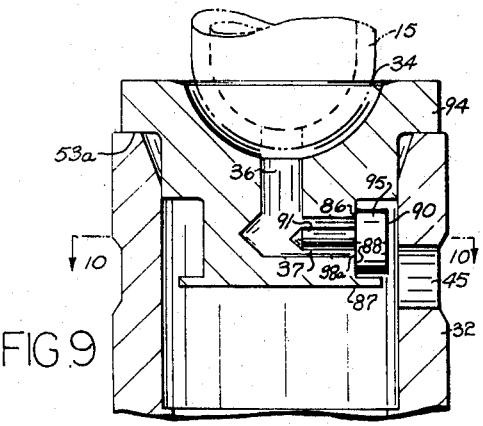
FIG. 9 is a sectional view of still a further embodiment of the present invention.
Figure 10:
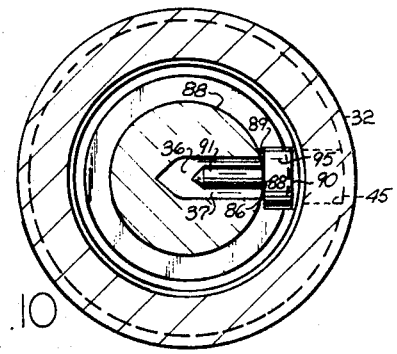
FIG. 10 is a sectional view taken approximately along the line 10—10 of FIG. 9.

A further embodiment of the present invention is illustrated in FIG. 9. In this embodiment, a metering rivet 95 is used to meter the flow of lubricant from the reservoir 40 to the rocker arm 17. The meter rivet 95 has a head portion 90 and a pin portion 91. The head portion 90 has a flat inner metering surface 86 which cooperates with the annular peripheral metering surface 88 of the socket 94 to form a tapered passageway 89 therebetween, as shown in FIG. 10. The pin portion 91 of the metering rivet 95 maintains the rivet member 95 in position even though the rivet member 95 moves substantially perpendicular to the direction of movement of the lifter. The annular shoulder 87 on the socket member 94 restricts the vertical motion of the rivet member 95.

The flat inner surface 86 of the rivet member 95 cooperates with the outer peripheral surface 88 of the socket member 94 to form the tapered metering passageway 89. The passageway 37 is constructed to become restricted upon the application of lubricant pressure to the rivet head 90. The movement of the rivet 95 to accomplish metering of lubriacnt through passageway 37 operates in essentially the same way as the movement of the metering rings previously discussed. The rivet 95 also has a loose fit within the inlet 38a to facilitate cleaning of the inlet and the metering surfaces in a manner similar to the manner in which the metering rings described above clean their cooperating metering surfaces. Accordingly, the operation of the lifter incorporating the metering rivet 90 is essentially the same as that of the hydraulic valve lifter illustrated in FIG. 2.

Figure 11:
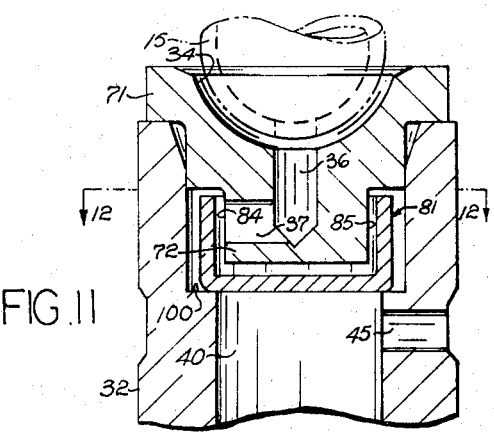
FIG. 11 is a fragmentary sectional view of still another embodiment of the present invention.
Figure 12:
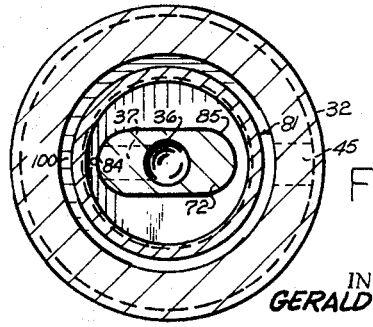
FIG. 12 is a sectional view taken approximately along section line 12—12 of FIG. 11.

The embodiment of the present invention illustrated in FIGS. 11 and 12 has many structural features which are similar to the embodiment shown in FIGS. 7 and 8 and, therefore, the same reference numerals will be used to designate corresponding elements in FIGS. 11 and 12. The embodiment of FIGS. 11 and 12 includes a plunger member 32 which defines a pressure chamber 40. The plunger member 32 has an opening 45 therein for delivering fluid thereto from a suitable pump.

The plunger member 32 cooperates with a socket member 71 which has a push rod seat 34 in which the push rod 15 rests. The socket member 71 has a passageway 36 which intersects the push rod seat 34 and a radially extending passageway 37 which communicates with the passageway 36 and has an opening 84 which intersects the outer peripheral surface 85 of the socket member 71. The surface 85 of the socket member 71 is an elliptical surface, best shown in FIG. 12, and which forms the outer peripheral surface of a projection 72 which extends downwardly from the main body of the socket member 71.

The hydraulic lifter shown in FIG. 11 includes a metering cup member 81. The metering cup member 81 cooperates with the outer peripheral surface 85 of the projection 72 of the socket member 71 to effect a metering of the flow of lubricant from the reservoir 40 to the passageway 37. The cup member 81 operates to effect this metering action in the same manner as described hereinabove in connection with FIGS. 7 and 8. It should be apparent, of course, that the elliptical-shaped surface 85 does provide a small radius for effecting the metering and is an alternative to making the bottom portion of the socket member 71 offset, as shown in FIGS. 7 and 8.

The hydraulic lifter of FIGS. 11 and 12 is constructed so as to prevent draining of fluid from the push rod 15 into the reservoir 40 and through the opening 45 in the plunger member upon stopping of the engine of the vehicle. To this end, the plunger member 32 is provided with a shoulder 100 located above the opening 45 in the plunger member 32. The shoulder 100 supports the cup member 81 during engine shutdown. Upon engine shutdown, the cup member 81 falls onto the shoulder 100 and effects a fluid seal therebetween. As a result of the fluid seal between the cup member 81 and the shoulder 100, lubricant is prevented from draining out of the push rod downwardly into the reservoir 40 and through the opening 45. This drain prevention feature may also be provided by the use of a plate member which provides the fluid seal and is used in combination with the metering ring of the embodiment of FIG. 2, for example. As a result of the anti-drain feature, when the engine is restarted, lubricant will be provided at the rocker arm much more quickly than if the lubricant was allowed to drain out of the push rod, making it necessary to refill the push rod before lubricant would be delivered to the rocker arm. When the engine is restarted, the fluid pressure in the reservoir 40 forces the cup member 81 upwardly away from the shoulder 100 and lubricant again is metered to the push rod 15 due to the fact that the fluid pressure forces the cup member 81 against the portion of the projection 72 containing the opening 84. This provides for metering between the internal diameter of the cup member 81 and the surface 85 of the projection 72.

Having described my invention, I claim:

1. A hydraulic valve lifter comprising a body member, a plunger member located in said body member and defining at least in part a fluid reservoir, a socket member operatively associated with the plunger member and movable upon movement of said plunger member, said socket member having a fluid passageway therein for directing fluid from said reservoir, and a separate metering member operatively associated with said socket member for metering the flow of fluid from said reservoir into said fluid passageway, said metering member having an internal metering surface which cooperates with an external metering surface on said socket member to define a metering passage communicating with said fluid passageway, said cooperating metering surfaces of said metering member and said socket member extending substantially parallel to the direction of movement of said socket member.

2. A hydraulic valve lifter as defined in claim 1 wherein said metering member is movable in response to fluid pressure acting thereon to control the fluid flow through said fluid passageway.

3. A hydraulic valve lifter as defined in claim 2 wherein said metering member is movable substantially perpendicular to the movement of said socket member.

4. A hydraulic valve lifter comprising a body member, a plunger member located in said body member and defining at least in part a fluid reservoir, a socket member operatively associated with the plunger member and movable upon movement of said plunger member, said socket member having a fluid passageway therein for directing fluid from said reservoir, and a separate metering member operatively associated with said socket member for metering the flow of fluid from said reservoir into said fluid passageway, said metering member and said socket member having cooperating metering surfaces which define a tapered metering passage communicating with said fluid passageway, said cooperating metering surfaces of said metering member and said socket member extending substantially parallel to the direction of movement of said socket member, said metering member being movable in a direction substantially perpendicular to the movement of said socket member in response to fluid pressure acting thereon to control the fluid flow through said fluid passageway, said socket member including an annular peripheral surface having an inlet to said fluid passageway, and said metering member comprises an annular metering member encircling said socket member and having an annular inner surface cooperating with said annular peripheral surface of said socket member to define said tapered metering passage therebetween.

5. A hydraulic valve lifter as defined in claim 4 wherein said annular peripheral surface is on a lower portion of said socket member offset from the axial centerline of said socket member and wherein said metering member encircles said lower portion and is radially offset therefrom.

6. A hydraulic valve lifter as defined in claim 4 wherein said annular metering member comprises a metering ring, said metering ring having a loose fit with the inner surface of said plunger member and the outer surface of said socket member.

7. A hydraulic valve lifter as defined in claim 4 wherein said annular metering member comprises a metering cup having an inner surface extending perpendicular to a base surface thereof and loosely encircling said socket member, said metering cup having an annular outer surface fitting loosely within said plunger member.

8. A hydraulic valve lifter comprising a body member, a plunger member located in said body member and defining at least in part a fluid reservoir, a socket member operatively associated with the plunger member and movable upon movement of said plunger member, said socket member having a fluid passageway therein for directing fluid from said reservoir, and a separate metering member operatively associated with said socket member for metering the flow of fluid from said reservoir into said fluid passageway, said metering member and said socket member having cooperating metering surfaces which define a tapered metering passage communicating with said fluid passageway, said cooperating metering surfaces of said metering member and said socket member extending substantially parallel to the direction of movement of said socket member, said metering member being movable in a direction substantially perpendicular to the movement of said socket member in response to fluid pressure acting thereon to control the fluid flow through said fluid passageway, said socket member having an annular peripheral surface with an inlet to said fluid passageway, and said metering member comprises a metering pin extending within said fluid passageway and having a surface cooperating with said annular peripheral surface to define said tapered metering passageway.

9. A hydraulic valve lifter comprising a body member, a plunger member located in said body member and defining at least in part a fluid reservoir, a socket member operatively associated with said plunger member, said socket member having an internal fluid passageway for directing fluid from said reservoir, and a separate annular metering member encircling said socket member and operable to meter the flow of fluid from said reservoir into said internal fluid passageway.

10. A hydraulic valve lifter as defined in claim 9 wherein said socket member is movable upon movement of said plunger member and said metering member includes an annular metering surface extending substantially parallel to the direction of movement of said socket member.

11. A hydraulic valve lifter as defined in claim 10 wherein said metering member is movable in response to fluid pressure thereon to control the fluid flow through said fluid passageway.

12. A hydraulic valve lifter as defined in claim 11 wherein said metering member is movable substantially perpendicular to the reciprocating motion of said socket member to restrict said metering passage.

13. A hydraulic valve lifter as defined in claim 12 wherein said metering member comprises an annular metering ring, said metering ring having a loose fit within the inner surface of the plunger member and around the outer peripheral surface of the socket member.

14. A hydraulic valve lifter as defined in claim 12 wherein said metering member comprises a metering cup having annular inner and outer surfaces extending perpendicular to a base surface, said inner surface fitting loosely with said socket member, said annular outer surface fitting loosely within said plunger member.

15. A hydraulic valve lifter for operating a valve gear train comprising a body member, a plunger located in said body member and at least in part defining a fluid reservoir, a socket member operatively associated with said plunger member and movable upon movement of the plunger member, said socket member having a fluid passageway therein for directing fluid from said reservoir to the gear train, a separate metering member movable substantially perpendicular to the direction of movement of said socket member in response to fluid pressure acting thereon and operatively associated with said socket member to meter the flow of fluid from said reservoir into said passageway.

16. A hydraulic valve lifter for operating a valve gear train comprising a body member, a plunger located in said body member and at least in part defining a fluid reservoir, a socket member operatively associated with said plunger member and movable upon movement of the plunger member, said socket member having a fluid passageway therein for directing fluid from said reservoir to the gear train, a separate metering member movable substantially perpendicular to the direction of movement of said socket member in response to fluid pressure acting thereon and operatively associated with said socket member to meter the flow of fluid from said reservoir into said passageway, said socket member including an annular peripheral surface having an inlet to said fluid passageway, said metering member encircling said socket member and having an inner surface cooperating with said annular peripheral surface to define a tapered metering passageway therebetween.

17. A hydraulic valve lifter as defined in claim 16 wherein said metering member comprises an annular metering ring, said metering ring having a loose fit within the plunger member and around said annular peripheral surface of said socket member.

18. A hydraulic valve lifter as defined in claim 16 wherein said metering member comprises a metering cup having said inner surface fitting loosely with said socket member, and said metering cup having an annular outer surface fitting loosely within said plunger member.

19. Apparatus for controlling the flow of fluid from a reservoir to a fluid passageway including a member having a peripheral cylindrical surface, said surface having an opening thereon communicating with a fluid passageway within said member, a metering member encircling said member and having an annular inner surface cooperable with said peripheral cylindrical surface to restrict the flow of fluid from the reservoir to the fluid passageway, said annular inner surface and said peripheral cylindrical surface being of different radii and defining a tapered passageway for restricting fluid flow from the reservoir into said fluid passageway.

20. Apparatus as defined in claim 19 wherein said metering member is operable to control said flow of fluid from the reservoir to the passageway in response to fluid pressure acting thereon by restricting said tapered passageway.

21. A hydraulic valve lifter for use with an engine comprising a body member, a plunger member located in said body member and defining at least in part a fluid reservoir, a socket member operatively associated with said plunger member, said socket member having an internal fluid passageway for directing fluid from said reservoir, a metering member having an internal surface cooperating with an arcuate external surface on said socket member to effect metering of the flow of fluid from said reservoir into said passageway, and means for blocking the flow of fluid from said passageway to said reservoir upon engine shutdown.

22. A hydraulic valve lifter as defined in claim 21 wherein said means for preventing flow of fluid from said passageway to said reservoir comprises a portion of said metering member which engages a portion of said plunger member to provide a seal therebetween, said plunger member having an opening therein providing for fluid flow into said reservoir, said seal being located above said opening in said plunger member.

23. A hydraulic valve lifter for use with an engine comprising a body member, a plunger member located in said body member and defining at least in part a fluid reservoir, a socket member operatively associated with said plunger member and movable upon movement of said plunger member, said socket member having a fluid passageway therein for directing fluid from said reservoir, a metering member having an arcuate surface cooperating with an arcuate surface on said socket member to effect metering of the flow of fluid from said reservoir into said passageway, and means for blocking the flow of fluid from said passageway to said reservoir upon engine shutdown, said means for preventing flow of fluid from said passageway to said reservoir comprises a portion of said metering member which engages a portion of said plunger member to provide a seal therebetween, said plunger member having an opening therein providing for fluid flow into said reservoir, said seal being located above said opening in said plunger member, said metering member comprises a cup-shaped member which encircles a portion of said socket member and wherein a base portion of said cup-shaped metering member engages a shoulder portion on said plunger member to provide said seal therebetween.

24. A hydraulic valve lifter comprising a body member, a plunger member located in said body member and defining at least in part a fluid reservoir, a socket member operatively associated with said plunger member and movable upon movement of said plunger member, said socket member having a fluid passageway therein for directing fluid from said reservoir, and a separate annular metering member encircling said socket member and operable to meter the flow of fluid from said reservoir into said passageway, said metering member being movable in response to fluid pressure thereon in a direction substantially perpendicular to the reciprocating motion of said socket member to restrict said metering passage and thereby control the fluid flow through said fluid passageway, said metering member including a metering cup having annular inner and outer surfaces extending substantially parallel to the direction of movement of said socket member and perpendicular to a base surface, said inner surface fitting loosely with said socket member, said annular outer surface fitting loosely within said plunger member.

25. A hydraulic valve lifter for operating a valve gear train in an engine comprising a body member, a plunger located in said body member and at least in part defining a fluid reservoir, a socket member operatively associated with said plunger member and movable upon movement of the plunger member, said socket member having an external metering surface and an internal fluid passageway communicating therewith for directing fluid from said reservoir to the gear train, and a rigid metering member having a cylindrical internal surface which loosely circumscribes and is at least partially spaced from said socket member, said cylindrical internal surface of said metering member cooperating with said external metering surface on said socket member to meter the flow of fluid from said reservoir through said passageway to said gear train.

26. A hydraulic lifter as set forth in claim 25 wherein said rigid metering member includes means for engaging an external portion of said plunger member to provide a seal therebetween to block a flow of fluid from said passageway to said reservoir upon engine shutdown.

References Cited

UNITED STATES PATENTS

| | | | |
|---|---|---|---|
| 2,210,480 | 8/1940 | Brice | 138—42 |
| 2,688,317 | 9/1954 | Voorhies. | |
| 2,870,757 | 1/1959 | Dayton. | |
| 2,992,639 | 7/1961 | Shirey. | |
| 3,053,239 | 9/1962 | Pechenik. | |
| 3,128,749 | 4/1964 | Dadd. | |
| 3,137,282 | 6/1964 | Voorhies. | |
| 3,273,547 | 9/1966 | Lesher. | 137—513.5 X |

AL LAWRENCE SMITH, Primary Examiner

U.S. Cl. X.R.

137—513.5; 138—42; 184—6

PO-1050
(5/69)

UNITED STATES PATENT OFFICE
CERTIFICATE OF CORRECTION

Patent No. 3,476,093   Dated November 4, 1969

Inventor(s) Gerald D. Line

It is certified that error appears in the above-identified patent and that said Letters Patent are hereby corrected as shown below:

Column 10, line 36, insert --- arcuate --- after "an".

SIGNED AND
SEALED
JUL 7 1970

(SEAL)
Attest:

Edward M. Fletcher, Jr.
Attesting Officer

WILLIAM E. SCHUYLER, JR.
Commissioner of Patents